(12) United States Patent
Dlugosz et al.

(10) Patent No.: US 10,872,267 B2
(45) Date of Patent: Dec. 22, 2020

(54) METHOD FOR IDENTIFICATION OF CHARACTERISTIC POINTS OF A CALIBRATION PATTERN WITHIN A SET OF CANDIDATE POINTS IN AN IMAGE OF THE CALIBRATION PATTERN

(71) Applicant: Aptiv Technologies Limited, St. Michael (BB)

(72) Inventors: Rafal Dlugosz, Poznan (PL); Waldemar Dworakowski, Cracow (PL); Zofia Dlugosz, Lubon (PL); Krzysztof Gongolewski, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 3 days.

(21) Appl. No.: 15/779,904

(22) PCT Filed: Nov. 17, 2016

(86) PCT No.: PCT/EP2016/078006
§ 371 (c)(1),
(2) Date: May 30, 2018

(87) PCT Pub. No.: WO2017/093035
PCT Pub. Date: Jun. 8, 2017

(65) Prior Publication Data
US 2018/0357509 A1    Dec. 13, 2018

(30) Foreign Application Priority Data

Nov. 30, 2015   (EP) ..................... 15196969

(51) Int. Cl.
*G06K 9/62* (2006.01)
*G06T 7/80* (2017.01)
*G06K 9/32* (2006.01)

(52) U.S. Cl.
CPC .......... *G06K 9/6211* (2013.01); *G06K 9/3233* (2013.01); *G06T 7/80* (2017.01);
(Continued)

(58) Field of Classification Search
CPC ....... G06T 7/80; G06K 9/3233; G06K 9/6211
See application file for complete search history.

(56) References Cited

U.S. PATENT DOCUMENTS 5,982,912 A  *  11/1999  Fukui ................. G06K 9/00221
                                                    382/115
6,292,171 B1       9/2001  Fu et al.
(Continued)

FOREIGN PATENT DOCUMENTS

| CN | 103035005 | 4/2013 |
|---|---|---|
| EP | 3125196 | 2/2017 |
| EP | 3179462 | 6/2017 |

OTHER PUBLICATIONS

"Non-Final Office Action", U.S. Appl. No. 16/266,268, dated Jul. 29, 2020, 7 pages.
(Continued)

*Primary Examiner* — Edward Park
(74) *Attorney, Agent, or Firm* — Colby Nipper PLLC

(57) ABSTRACT

A method for identification of characteristic points of a calibration pattern within an image includes: (i) overlaying a template arrangement of template points over the candidate point such that a principal point of the template points coincides with the candidate point, wherein the template arrangement corresponds to the calibration pattern or to a sub-pattern of the calibration pattern, (ii) for each template point of the template arrangement, except the principal point, identifying from the set of candidate points the candidate point closest to the template point, and (iii) determining a degree of deviation by summing the distances between each template point of the template arrangement,
(Continued)

except the principal point, and the candidate point closest to this template point; and identifying as characteristic points of the calibration pattern all those candidate points of the set of candidate points with a degree of deviation below a deviation threshold.

18 Claims, 2 Drawing Sheets

(52) U.S. Cl.
CPC ............... *G06T 2207/30208* (2013.01); *G06T 2207/30244* (2013.01)

(56) References Cited

U.S. PATENT DOCUMENTS

| | | | |
|---|---|---|---|
| 6,915,072 | B2 | 7/2005 | Takahashi et al. |
| 8,295,588 | B2 | 10/2012 | Fujieda |
| 9,319,667 | B2 | 4/2016 | Lin et al. |
| 9,441,958 | B2 | 9/2016 | Hara |
| 9,739,603 | B2 | 8/2017 | Hara |
| 10,218,961 | B2 | 2/2019 | Kishiwada et al. |
| 10,776,953 | B2 | 9/2020 | Dworakowski et al. |
| 2002/0044676 | A1* | 4/2002 | Wei ..................... A61B 6/5241 382/132 |
| 2004/0225472 | A1 | 11/2004 | Kraft |
| 2006/0215031 | A1 | 9/2006 | Krahnstoever et al. |
| 2006/0288325 | A1 | 12/2006 | Miyamoto et al. |
| 2007/0047940 | A1 | 3/2007 | Matsumoto et al. |
| 2008/0080744 | A1 | 4/2008 | Tanaka |
| 2008/0095445 | A1 | 4/2008 | Brandt |
| 2008/0170228 | A1 | 7/2008 | Jiang |
| 2009/0231374 | A1 | 9/2009 | Van De Wynckel et al. |
| 2009/0299684 | A1 | 12/2009 | Imanishi et al. |
| 2010/0295948 | A1 | 1/2010 | Xie et al. |
| 2010/0134634 | A1 | 6/2010 | Watt |
| 2010/0217416 | A1* | 8/2010 | Murabata ........... G05B 19/4093 700/98 |
| 2010/0232681 | A1 | 9/2010 | Fujieda et al. |
| 2010/0315601 | A1 | 12/2010 | Furui |
| 2011/0069284 | A1 | 3/2011 | Furui |
| 2011/0234759 | A1* | 9/2011 | Yamaya .................. G06T 17/00 348/46 |
| 2011/0300939 | A1 | 12/2011 | Mao et al. |
| 2011/0321084 | A1* | 12/2011 | Takahashi .......... H04N 5/23293 725/32 |
| 2012/0033087 | A1 | 2/2012 | Takeda |
| 2012/0230600 | A1 | 9/2012 | Tsai et al. |
| 2012/0233841 | A1 | 9/2012 | Stein |
| 2012/0327220 | A1 | 12/2012 | Ma |
| 2013/0051664 | A1 | 2/2013 | Fujita et al. |
| 2013/0216153 | A1 | 8/2013 | Hsu |
| 2014/0043473 | A1 | 2/2014 | Gupta et al. |
| 2014/0293299 | A1 | 10/2014 | Ozawa |
| 2015/0049193 | A1 | 2/2015 | Gupta et al. |
| 2015/0078675 | A1 | 3/2015 | Tian et al. |
| 2015/0245020 | A1 | 8/2015 | Meier et al. |
| 2015/0287215 | A1 | 10/2015 | Ohba et al. |
| 2016/0180176 | A1 | 6/2016 | Yamamoto |
| 2017/0177973 | A1* | 6/2017 | Hu ....................... G06K 9/6202 |
| 2017/0316557 | A1 | 11/2017 | Inoue |
| 2018/0080787 | A1 | 3/2018 | Laine et al. |
| 2018/0122099 | A1 | 5/2018 | Lee |
| 2018/0170540 | A1 | 6/2018 | Claybrough |
| 2018/0197276 | A1 | 7/2018 | Kim et al. |
| 2018/0322656 | A1 | 11/2018 | Dworakowski et al. |
| 2018/0357791 | A1 | 12/2018 | Dworakowski et al. |
| 2019/0266752 | A1 | 8/2019 | Dlugosz et al. |
| 2019/0266753 | A1 | 8/2019 | Dworakowski et al. |

OTHER PUBLICATIONS

"Notice of Allowance", U.S. Appl. No. 16/266,268, dated Oct. 15, 2020, 5 pages.
"Advisory Action", U.S. Appl. No. 15/779,895, dated Apr. 17, 2020, 2 pages.
"Final Office Action", U.S. Appl. No. 15/779,880, dated Mar. 23, 2020, 10 pages.
"Final Office Action", U.S. Appl. No. 15/779,895, dated Dec. 12, 2019, 17 pages.
"Non-Final Office Action", U.S. Appl. No. 15/779,895, dated Aug. 21, 2020, 11 pages.
"Non-Final Office Action", U.S. Appl. No. 15/779,895, dated Aug. 29, 2019, 17 pages.
"Non-Final Office Action", U.S. Appl. No. 16/266,555, dated Sep. 24, 2020, 27 Pages.
"Non-Final Office Action", U.S. Appl. No. 15/779,880, dated Dec. 11, 2019, 11 pages.
"Notice of Allowance", U.S. Appl. No. 15/779,880, dated May 13, 2020, 10 pages.
Bay, et al., "Speeded-Up Robust Features (SURF)", Jun. 2008, pp. 346-359.
Lu, et al., "Fast and Globally Convergent Pose Estimation from Video Images", retrieved from https://ieeexplore.ieee.org/document/862199, Jun. 2000, 13 Pages.

* cited by examiner

METHOD FOR IDENTIFICATION OF CHARACTERISTIC POINTS OF A CALIBRATION PATTERN WITHIN A SET OF CANDIDATE POINTS IN AN IMAGE OF THE CALIBRATION PATTERN

TECHNICAL FIELD OF INVENTION

The invention relates to a method for identification of characteristic points of a calibration pattern within a set of candidate points in an image of the calibration pattern.

BACKGROUND OF INVENTION

For example, to calibrate the orientation of a camera mounted to a vehicle, especially to a truck, it can be useful to acquire an image of a calibration pattern placed in front of the vehicle and to derive the orientation of the camera from perspective distortions of the calibration pattern. Quantifying these distortions to determine, in particular, at least one of a roll angle, a yaw angle and a pitch angle of the camera relative to the vehicle, to the calibration pattern or, preferentially, to both, can especially require identification of characteristic points of the calibration pattern within the image of the calibration pattern. These characteristic points can then, for example, be used to determine at least two horizontal lines and two vertical lines with a horizontal vanishing point being defined by the representations of the horizontal lines in the image of the calibration pattern and a vertical vanishing point being defined by the representations of the vertical lines in the image of the calibration pattern. The roll angle can, in particular, be calculated from coordinates of the horizontal or the vertical vanishing point, the yaw angle from a first coordinate of the horizontal vanishing point along a first, essentially horizontal, axis of the image, and the pitch angle from a second coordinate of the vertical vanishing point along a second, essentially vertical, axis of the image. Such a method is described in the patent application titled "Method for calibrating the orientation of a camera mounted to a vehicle" of the same applicant and filed at the same filing date as this application, which is hereby referenced.

For identifying characteristic points in an image of a calibration pattern—be they needed for said calibrating the orientation of a camera mounted to a vehicle or for any other purpose—, the image may be preprocessed, for example, smoothed and/or filtered. Especially, the (smoothed) image can be filtered such that regions indicative of respective characteristic points appear as spots in the filtered image having pixel values exceeding a certain threshold. The spots might then be identified within the filtered image by an algorithm walking through the image until a pixel with a pixel value exceeding the threshold is found and then tracing a contour of the spot around the spot along the border between pixels whose pixel values exceed the threshold and pixels whose pixel values do not exceed the threshold. In particular, at least possible characteristic points can then be determined as central points of respective spots with a respective central point being calculated as weighted average over the pixels of the spots. Such a method is described in the patent application titled "Method for identification of candidate points as possible characteristic points of a calibration pattern within an image of the calibration pattern" of the same applicant and filed at the same filing date as this application, which is hereby referenced.

However, it is possible that such a method or any other method for determining possible characteristic points within a given image not only leads to the characteristic points looked for, but also, for example, to secondary points of the calibration pattern and/or to spuriously identified points which might result from noise or other interferences in the image or from structures in a background of the image which accidentally resemble the calibration pattern or a sub-pattern of the calibration pattern. Therefore, the points obtained by the described methods or by another method may merely be possible characteristic points and, hence, can be regarded as a set of candidate points which are derived from the image of the calibration pattern and within which the true characteristic points of the calibration pattern still have to be identified.

It is an objective of the invention to provide a method capable of identifying the characteristic points of a calibration pattern within an image of the calibration pattern with high specificity and yet without the need for high computing capacity.

SUMMARY OF THE INVENTION

Given a set of candidate points derived from the image of the calibration pattern at least three steps are executed for each individual candidate point of the set.

The first of said three steps comprises overlaying a template arrangement of template points over the candidate point (i.e. the respective candidate point for which this step is currently executed) such that a principal point of the template points coincides with the candidate point, wherein the template arrangement corresponds to the calibration pattern or to a sub-pattern of the calibration pattern. The template arrangement comprises several template points one of which is the principal point of the template arrangement. This principal point is placed exactly on the candidate point currently under investigation.

The template arrangement serves as a template for the calibration pattern or sub-pattern which should, in some way, be present in the vicinity of the candidate point, if the candidate point is in fact a characteristic point of the calibration pattern. Hence the principal point of the template arrangement corresponds to the characteristic point and the other template points of the template arrangement correspond to secondary points of the calibration pattern merely helping in identifying a respective characteristic point of the calibration pattern.

For example, the calibration pattern comprises a sub-pattern formed by two equally oriented squares contrasting with a background of the calibration pattern, with a corner of one of the squares coinciding with a corner of the other of the squares. This can be regarded as a checkerboard with two rows and two columns only. Especially, the squares can at least essentially be dark or black on a bright or white background. Characteristic points of the calibration pattern containing one or more such sub-patterns may then be the centers of the respective sub-patterns where the corners of the two squares coincide. Secondary points of the calibration pattern can, for example, be all the other corners of the squares, i.e. with exception of the two coinciding corners. In particular, the template arrangement is then a set of seven template points placed as if the template points were the corners of said two squares. The template point in the center of the template arrangement then preferentially is the principal point of the template arrangement.

The size of the template arrangement may be adjusted to compensate for different scaling of the calibration pattern in the image of the calibration pattern. This may be necessary, because the size of the calibration pattern can vary in dependence of the focal length (zoom level) of the camera and/or the distance of the camera to the calibration pattern.

The second of said three steps comprises, for each template point of the overlaid template arrangement, except the principal point, identifying from the set of candidate points the candidate point closest to the template point. In other words, for each template point, one template point after the other, of all the candidate points that one is selected which is closest to the respective template point. For the principal point of the template arrangement this is not necessary. Because the template arrangement is placed such that the principal point coincides with the candidate point under investigation, this candidate point is of course the candidate point closest to the principal point so that a distance between this candidate point and the principal point is always zero.

After the respective candidate points closest to the template points of the template arrangement have been identified, as the third of said three steps a degree of deviation is determined by summing the distances between each template point of the template arrangement, except the principal point, and the candidate point closest to this template point. Again, the principal point is excepted, because it does not need to be considered. This is because the distance of the principal point of the template arrangement to the candidate point closest to the principal point is necessarily zero (because of their coincidence) and therefore does not contribute to said degree of deviation.

For all other template points there may be a non-zero distance to the respective candidate points, even if the template arrangement is overlaid to a true characteristic point of the calibration pattern and the template points in this case ideally coincide with secondary points of the calibration pattern or a sub-pattern of the calibration pattern. But due to perspective or other distortions, for example due to a lens or lens system of the camera the image is acquired with, and especially if an orientation of the camera is not such that an optical axis of the camera is perpendicular to a plane of the calibration pattern and the camera has a roll angle of zero, there most probably will be non-zero distances between the template points and the respective closest candidate points. The accumulated distance summed over all individual distances will increase with greater deviation from the ideal. Therefore said sum of distances can be used as a measure for the deviation of the candidate point and its surroundings from the calibration pattern or a sub-pattern of the calibration pattern. The degree of deviation might be normalized by a factor, for example by dividing said sum of distances by the number of summands. However, this is not necessary, since the degree of deviation is primarily used as a relative measure.

After said at least three steps have been executed for each candidate point of the set of candidate points, all those candidate points of the set of candidate points having a degree of deviation below a deviation threshold are identified as characteristic points of the calibration pattern. The threshold may be predetermined and possibly adapted to a normalization of the degree of deviation. However, the threshold can also be dynamically defined, for example by setting the threshold such that an expected number of characteristic points are obtained. Alternatively, the threshold can be dynamically defined by analyzing the distribution of the degrees of deviation for all candidate points and setting the threshold such that it separates a first significant accumulation of degrees of deviation from degrees of deviation with substantially higher values.

The method described uses mainly simple arithmetic operations for placing the template arrangement, identifying the candidate points closest to respective template points, calculating the degrees of deviation by summation of distances and comparing the degrees of deviation with the threshold. Despite the simplicity of the method, it is well-suited to separating the wheat from the chaff as regards the candidate points as possible characteristic points of the calibration pattern.

According to an embodiment, for each candidate point of the set of candidate points, a region of interest is defined around the candidate point having a predefined area and shape so as to encompass the template arrangement when the template arrangement is overlaid to the candidate point. Preferentially, for each template point of the template arrangement, except the principal point, the candidate point closest to the template point is identified from those candidate points lying in the region of interest. Hence, by such a region of interest the area to be searched for the closest candidate point to a respective template point can be reduced. This especially reduces the number of distance comparisons and therefore contributes to a faster execution of the method.

However, if such a region of interest is used, it may happen that for some template points of the template arrangement no closest candidate point is found. Since for these template points a distance to their respective closest candidate points cannot be calculated, they are omitted from the sum calculated to determine the degree of deviation. Especially, there may be no candidate point at all within the region of interest, except the candidate point under investigation which coincides with the principal point of the template arrangement. In such a case, the degree of deviation would be zero and hence below the threshold, even though the single candidate point in the region of interest is not a characteristic point of the calibration pattern. Such cases therefore have to be considered separately, an example of which is described further below.

According to an embodiment, the calibration pattern is an arrangement of sub-patterns comprising at least a first sub-pattern and a second sub-pattern. In such an embodiment, the identification of the characteristic points is executed mostly as described before. However, for each candidate point of the set of candidate points, preferentially, a first degree of deviation is determined by summing the distances between each template point of a first template arrangement, except a principal point coinciding with the candidate point, and the candidate point closest to this template point, and a second degree of deviation is determined by summing the distances between each template point of a second template arrangement, except a principal point coinciding with the candidate point, and the candidate point closest to this template point, wherein the first and second template arrangements correspond to the first and second sub-patterns, respectively. In other word, the at least three steps executed for each candidate point of the set of candidate points are executed twice, once for the first template arrangement and once for the second template arrangement, so as to check for a match with either the first sub-pattern or the second sub-pattern.

After having determined first and second degrees of deviation for each candidate point of the set of candidate points, a respective candidate point of the set is identified as a characteristic point of a first type, if its first degree of deviation is less than its second degree of deviation and is below a first deviation threshold, and is identified as a characteristic point of a second type, if its second degree of deviation is less than its first degree of deviation and is below a second deviation threshold. Thus not only are the true characteristic points within the set of possible characteristic points identified, but they are also individually related to a respective one of the first and second sub-patterns. This information can then be output additionally to the mere locations of the characteristic points identified as such.

According to an embodiment, the candidate point is only identified as a characteristic point of a respective type, in particular as a characteristic point of first type or as a characteristic point of second type, if not both of its first degree of deviation and its second degree of deviation are equal to zero. As mentioned above, a degree of deviation might be zero either in the unlikely event of perfect coincidence of the template points with the respective candidate points or in the event that no candidate points closest to the template points are found (especially if a region of interest is used as described above, in particular the same region of interest for both the first and second template arrangement). If no closest candidate points can be found, the degree of deviation is zero independent of the respective template arrangement. Therefore, at least one of the first and second degrees of deviation has to be non-zero for the respective candidate point to be identified as characteristic point of the calibration pattern.

Distances can be calculated in different ways. In particular, the distance between a template point of the template arrangement and a candidate point identified as candidate point closest to this template point is the square root of the sum of the squares of the coordinate differences between the template point and the candidate point. This corresponds to a Euclidean metric.

Alternatively, the distance between a template point of the template arrangement and a candidate point identified as candidate point closest to this template point is the sum of the squares of the coordinate differences between the template point and the candidate point. This differs from the preceding metric by omission of calculating the square root. Hence the distance corresponds to the square of the Euclidean metric. Using such a metric has the advantage that omission of the root leads to reduced computing time.

As a further alternative, the distance between a template point of the template arrangement and a candidate point identified as candidate point closest to this template point can be the sum of the absolute coordinate differences between the template point and the candidate point. This corresponds to the so-called Manhattan or taxicab metric, which is even simpler to calculate than the squared Euclidean metric, as it only comprises summing and subtracting, yet leads to satisfactory results.

Whichever metric is used for said distance calculation, the same metric is preferably also used to determine the closest candidate point to a respective template point.

According to an embodiment, after identifying the characteristic points, the characteristic points are output for further evaluation. The output characteristic points (possibly including their respective type) can especially be used for determining an orientation of a camera, by means of which the image of the calibration pattern has been acquired as described above.

Furthermore, in such an embodiment, it is preferred that each characteristic point is output together with the candidate points identified as closest to a respective template point of the template arrangement overlaid over the characteristic point. These candidate points, which are additionally output, are in particular said secondary points of the calibration pattern or a respective sub-pattern of the calibration pattern, which are located in a vicinity of a respective characteristic point and by their presence help in identifying the characteristic point.

The objective of the invention is furthermore solved by a computer program product in accordance with claim 10 and in particular by a computer program product with a computer program which has software means for carrying out a method in accordance with at least one of the embodiments described above, if the computer program is executed in a computing device. Due to the preferably low complexity of the calculations during execution of the method, the computer program may especially be suited to be executed on a microcontroller or an embedded system of a camera with which the image of the calibration pattern is acquired.

BRIEF DESCRIPTION OF DRAWINGS

In the following, the invention is exemplarily further described with reference to the Figures.

DETAILED DESCRIPTION

Figure 1:
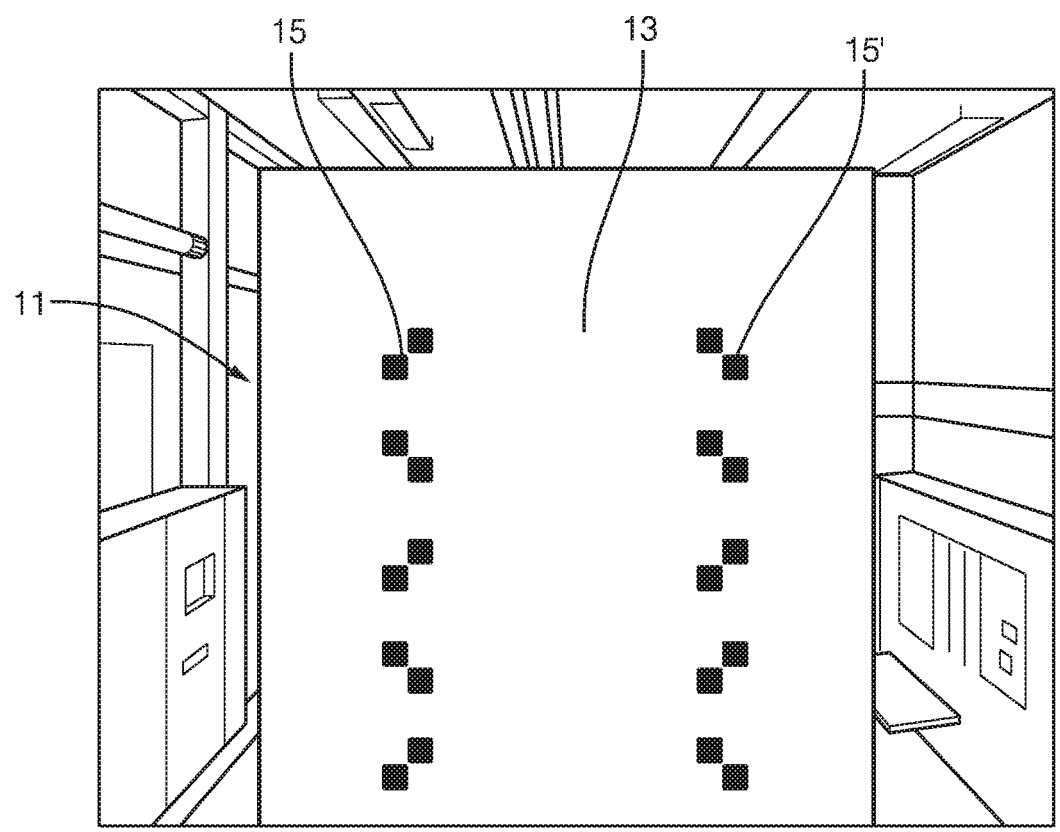
FIG. 1 is a calibration pattern for calibrating a camera in accordance with one embodiment.

FIG. 1 shows an exemplary image 11 of a calibration pattern 13 acquired with a camera which is not shown. The calibration pattern 13 comprises ten sub-patterns 15, 15', representations of which can be recognized in the image 11. There are sub-patterns of a first type 15 and sub-patterns of a second type 15'. The sub-patterns 15, 15' of both types are each formed by two equally oriented squares, with a corner of one of the squares coinciding with a corner of the other of the squares, wherein the relative orientation of the two squares of a respective sub-patterns of the first type 15 is perpendicular to the relative orientation of the two squares of a respective sub-pattern of the second type 15'.

Five of the sub-patterns 15, 15' are arranged along a first vertical line, the other five along a second vertical line. Each of the sub-patterns 15, 15' on the first vertical line forms a pair with a respective sub-pattern 15, 15' on the second vertical line such that both sub-patterns 15, 15' of a respective pair are aligned on a horizontal line. Hence, in total there are five horizontal lines. While the two vertical lines and the five horizontal lines are not depicted and hence are no explicit part of the calibration pattern, they are unambiguously defined by the sub-patterns 15, 15', in particular by respective characteristic points of these sub-patterns 15, 15' which are situated at the centers of the sub-patterns 15, 15', where the two squares are in contact to each other.

Especially, by convolution of the image 11 with a filter kernel corresponding to the sub-patterns 15, 15' and identifying spots within the such filtered image, possible characteristic points of the calibration pattern 13 can be determined (cf. white points in FIG. 1). Since these possible characteristic points also comprise false positives, they are candidate points which have to be further evaluated to identify the true characteristic points.

The true characteristic points are identified by searching for a point structure characteristic for the first sub-pattern 15 or for the second sub-pattern 15'. This is done by defining a region of interest 17 around a respective candidate point and overlaying a template arrangement such that a principal point of the template arrangement coincides with the candidate point, with a first template arrangement being specific to the first sub-pattern 15 and a second template arrangement being specific to the second sub-pattern 15'. This is shown exemplarily in FIG. 2, wherein four regions of interest 17 around a respective candidate point (cf. central black asterisk) are shown.

Figure 2:
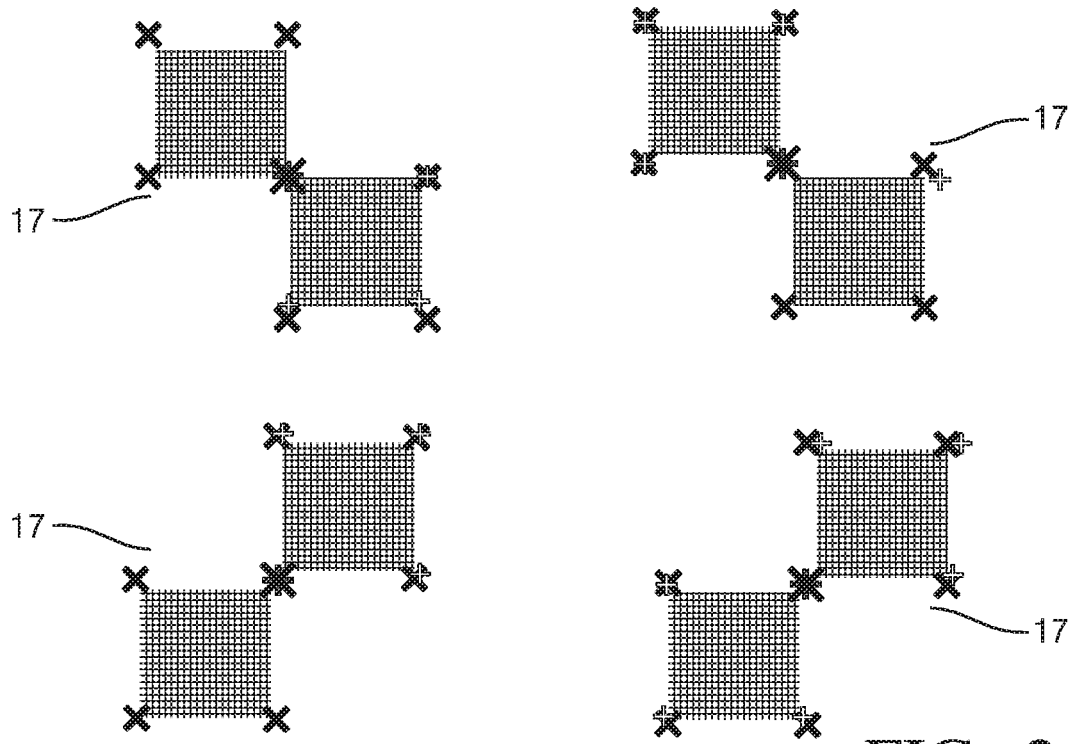
FIG. 2 is a template arrangement for calibrating a camera with the calibration pattern of FIG. 1 in accordance with one embodiment.

In FIG. 2 the white (horizontal and vertical) crosses are the candidate points within the respective region of interest 17. The black (diagonal) crosses are template points which together form the first or second template arrangement, respectively. The central template point depicted as black asterisk is the principal point of the template arrangement. Each region of interest 17 of FIG. 2 is shown including the candidate and template points contained therein and together with the respective region of the image 11 so that the respective sub-pattern 15, 15' of the calibration pattern 13 can be recognized. The upper two regions of interest 17 correspond to the first sub-pattern 15, while the lower two regions of interest 17 correspond to the second sub-pattern 15'. Therefor, in the upper two regions of interest 17 the first template arrangement corresponding to the first sub-pattern 15 is shown, and in the lower two regions of interest 17 the second template arrangement corresponding to the second sub-pattern 15' is shown.

As can be seen from FIG. 2, the template points of a respective template arrangement, except the principal point, do not perfectly coincide with their closest candidate points. The overall (first or second, respectively) degree of deviation is calculated by summing the distances between the template points and their respective closest candidate points. If the candidate point over which the template arrangement is overlaid is a characteristic point of the first sub-pattern 15 or the second sub-pattern 15' and the corresponding template arrangement is used (as in FIG. 2), the distances are relatively small. For spurious candidate points the distances would be distinctively greater. Therefore, the degree of deviation can be used to distinguish true characteristic points of the calibration pattern 13 from spurious ones.

Figure 3:
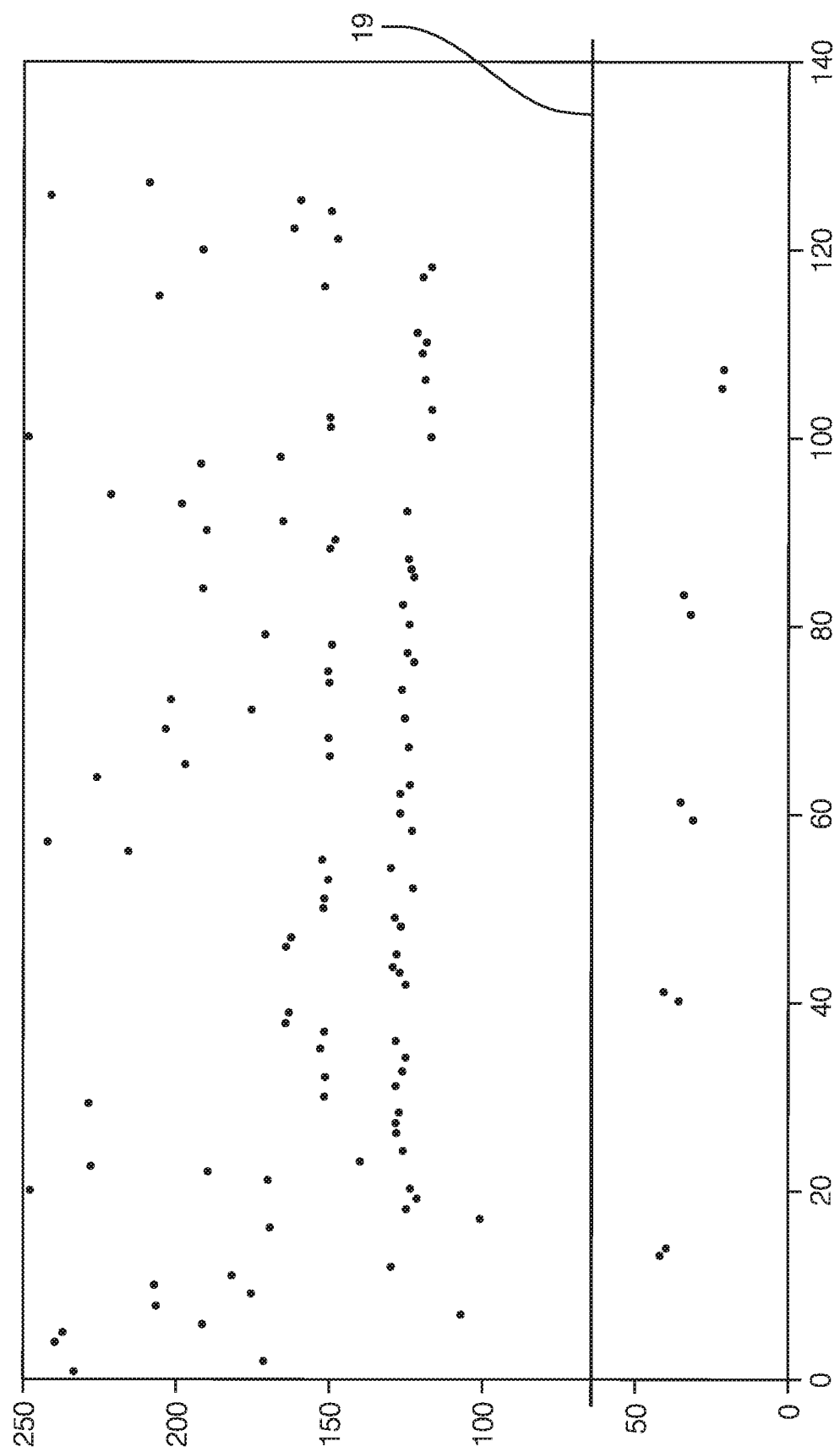
FIG. 3 is a graph of calibrating a camera in accordance with one embodiment.

This is exemplarily shown in FIG. 3. In FIG. 3 the calculated degrees of deviation of all candidate points within the image 11 are plotted as dots in a diagram. As can be directly seen, most degrees of deviation have high values with only a few being separate from the bulk having values in a lower range. A threshold 19 is indicated as a line separating the bulk from these few. With exception of the dots corresponding to a degree of deviation of zero, all dots below the threshold 19 then represent characteristic points of the calibration pattern 13. In this way the characteristic points of the calibration pattern 13 are reliably identified.

The invention claimed is:

1. A method for identification of characteristic points of a calibration pattern within an image of the calibration pattern, the method comprising the steps of
   for each candidate point of a set of candidate points derived from the image of the calibration pattern:
   overlaying a template arrangement of template points over the candidate point such that a principal point of the template points coincides with the candidate point, wherein the template arrangement corresponds to the calibration pattern or to a sub-pattern of the calibration pattern,
   for each template point of the overlaid template arrangement, except the principal point, identifying from the set of candidate points the candidate point closest to the template point, and determining a degree of deviation by summing the distances between each template point of the template arrangement, except the principal point, and the candidate point closest to this template point; and
   identifying as characteristic points of the calibration pattern all those candidate points of the set of candidate points with a degree of deviation below a deviation threshold.

2. The method in accordance with claim 1,
   wherein for each candidate point of the set of candidate points, a region of interest is defined around the candidate point having a predefined area and shape so as to encompass the template arrangement when the template arrangement is overlaid to the candidate point,
   and wherein for each template point of the template arrangement, except the principal point, the candidate point closest to the template point is identified from those candidate points lying in the region of interest.

3. The method in accordance with claim 1,
   wherein the calibration pattern is an arrangement of sub-patterns comprising at least a first sub-pattern and a second sub-pattern,
   wherein for each candidate point of the set of candidate points,
   a first degree of deviation is determined by summing the distances between each template point of a first template arrangement, except a principal point coinciding with the candidate point, and the candidate point closest to this template point, and
   a second degree of deviation is determined by summing the distances between each template point of a second template arrangement, except a principal point coinciding with the candidate point, and the candidate point closest to this template point,
      wherein the first and second template arrangements correspond to the first and second sub-patterns, respectively, and wherein the candidate point is identified as a characteristic point of a first type, if its first degree of deviation is less than its second degree of deviation and is below a first deviation threshold, and is identified as a characteristic point of a second type, if its second degree of deviation is less than its first degree of deviation and is below a second deviation threshold.

4. The method in accordance with claim 3, wherein the candidate point is only identified as a characteristic point of a respective type, if not both of its first degree of deviation and its second degree of deviation are equal to zero.

5. The method in accordance with claim 1, wherein the distance between a template point of the template arrangement and a candidate point identified as candidate point closest to this template point is the square root of the sum of the squares of the coordinate differences between the template point and the candidate point.

6. The method in accordance with claim 1, wherein the distance between a template point of the template arrangement and a candidate point identified as candidate point closest to this template point is the sum of the squares of the coordinate differences between the template point and the candidate point.

7. The method in accordance with claim 1, wherein the distance between a template point of the template arrangement and a candidate point identified as candidate point closest to this template point is the sum of the absolute coordinate differences between the template point and the candidate point.

8. The method in accordance with claim 1, wherein after identifying the characteristic points the characteristic points are output for further evaluation.

9. The method in accordance with claim 8, wherein each characteristic point is output together with the candidate points identified as closest to a respective template point of the template arrangement overlaid over the characteristic point.

10. A non-transitory computer-readable storage-medium comprising one or more programs for execution by one or more processors of a first device, the one or more programs including instructions which, when executed by the one or more processors, cause the first device to perform the method of claim 1.

11. A method for identification of characteristic points of a calibration pattern within an image of the calibration pattern, comprising:
for each candidate point of a set of candidate points derived from the image of the calibration pattern:
overlaying a template arrangement of template points over the candidate point such that a principal point of the template points coincides with the candidate point, wherein the template arrangement corresponds to the calibration pattern or to a sub-pattern of the calibration pattern; and
determining a degree of deviation by summing the distances between each template point of the template arrangement, except the principal point, and the candidate point closest to this template point.

12. The method in accordance with claim 11, wherein
for each template point of the overlaid template arrangement, except the principal point, identifying from the set of candidate points the candidate point closest to the template point.

13. The method in accordance with claim 11, wherein
identifying as characteristic points of the calibration pattern all those candidate points of the set of candidate points with a degree of deviation below a deviation threshold.

14. The method in accordance with claim 11,
wherein for each candidate point of the set of candidate points, a region of interest is defined around the candidate point having a predefined area and shape so as to encompass the template arrangement when the template arrangement is overlaid to the candidate point.

15. The method in accordance with claim 14,
wherein for each template point of the template arrangement, except the principal point, the candidate point closest to the template point is identified from those candidate points lying in the region of interest.

16. The method in accordance with claim 11,
wherein the calibration pattern is an arrangement of sub-patterns comprising at least a first sub-pattern and a second sub-pattern,
wherein for each candidate point of the set of candidate points,
a first degree of deviation is determined by summing the distances between each template point of a first template arrangement, except a principal point coinciding with the candidate point, and the candidate point closest to this template point.

17. The method in accordance with claim 16, wherein
a second degree of deviation is determined by summing the distances between each template point of a second template arrangement, except a principal point coinciding with the candidate point, and the candidate point closest to this template point.

18. The method in accordance with claim 17, wherein
the first and second template arrangements correspond to the first and second sub-patterns, respectively, and wherein the candidate point is identified as a characteristic point of a first type, if its first degree of deviation is less than its second degree of deviation and is below a first deviation threshold, and is identified as a characteristic point of a second type, if its second degree of deviation is less than its first degree of deviation and is below a second deviation threshold.

* * * * *